United States Patent [19]

Levacher et al.

[11] Patent Number: 4,634,217

[45] Date of Patent: Jan. 6, 1987

[54] HIGH TENSILE WIRE PROVIDED WITH LIGHT GUIDE SENSOR

[75] Inventors: Friedrich K. Levacher, P.Brauweiler; Helmut Federmann, Bergisch Gladbach, both of Fed. Rep. of Germany

[73] Assignee: Felten & Guilleaume Energietechnik GmbH, Köln, Fed. Rep. of Germany

[21] Appl. No.: 580,546

[22] Filed: Feb. 15, 1984

[30] Foreign Application Priority Data

Feb. 16, 1983 [DE] Fed. Rep. of Germany ....... 3305234

[51] Int. Cl.$^4$ ............................. G02B 6/44; H01J 5/16
[52] U.S. Cl. ............................. 350/96.23; 350/96.15; 350/96.29; 350/96.30; 250/227
[58] Field of Search ............... 350/96.10, 96.15, 96.23, 350/96.29, 96.30, 96.33; 250/227

[56] References Cited

U.S. PATENT DOCUMENTS

| 4,427,263 | 1/1984 | Lagakos et al. | 350/96.33 |
|---|---|---|---|
| 4,468,091 | 8/1984 | Schmadel et al. | 350/96.30 |
| 4,525,026 | 6/1985 | Elion | 350/96.23 |
| 4,525,626 | 6/1985 | Kush et al. | 350/96.29 |

FOREIGN PATENT DOCUMENTS

| 2648996 | 5/1977 | Fed. Rep. of Germany ... 350/96.23 |
| 2627174 | 12/1977 | Fed. Rep. of Germany ... 350/96.23 |
| 2912086 | 10/1979 | Fed. Rep. of Germany ... 350/96.23 |
| 2078996 | 1/1982 | United Kingdom ........... 350/96.29 |

*Primary Examiner*—William L. Sikes
*Assistant Examiner*—Brian M. Healy
*Attorney, Agent, or Firm*—Michael J. Striker

[57] ABSTRACT

A high tensile wire of a fiber-reinforced synthetic resin encloses an axially arranged light guide in the form of an optical fibers connectable to a light testing instrument. The light guide is enclosed in an intermediate sleeve of a heterogeneous synthetic material which is mechanically firmly connected both to the light guide and to the inner surface of the outer sleeve. In the preferred embodiment, the wire is used as a reinforcing span wire in concrete component parts and the attenuation of the light passing through the light guide indicates tensile strength, bending strength or breakage of the wire in the concrete.

5 Claims, 3 Drawing Figures

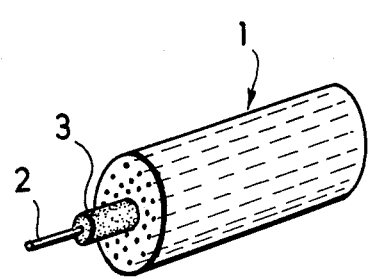
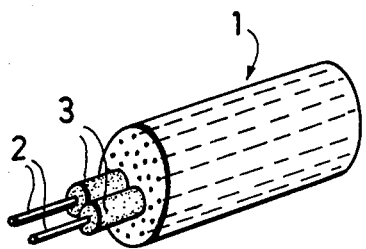
FIG.1  FIG.2
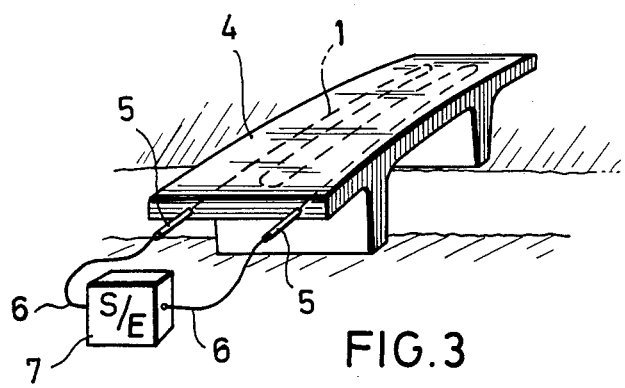
FIG.3

HIGH TENSILE WIRE PROVIDED WITH LIGHT GUIDE SENSOR

BACKGROUND OF THE INVENTION

The present invention relates to a high tensile wire structure including an outer sleeve of a fiber-reinforced resin material enclosing an elongated light guide the form of an optical fiber. The latter makes it possible to monitor optically the tensile stress, breakage or bending stress applied to the wire. The wire structure of this invention is applicable for example as a bracing wire for reinforced concrete.

From the German publication DE-OS No. 3,016,009 a method of producing fiber-reinforced resinous structures is known in which fibers drawn in one direction through a manufacturing apparatus are first impregnated with resin, then provided in warm air with a gel-like upper surface, and finally guided through a bath of molten metal having a temperature between 95° C. and the decompostion temperature of the resin. The fed-in resin has a composition which becomes crosslinked and hardened by the applied heat and which is kept in liquid condition at ambient or increased temperatures. The heat-hardening resin can be of various kinds, such as epoxy resins, polyamides, polyesters, phenolformaldehyde resin, silicon resins, and the like. This known method can be employed in connection with all known fibrous materials, such as for example glass fibers, steel fibers, Aramid fibers (registered trademark), graphite fibers and the like. These fibers can also enclose other fibers which in turn are coated with different protective layers, such as for instrance soft metal fibers (copper) or optical fibers. These structures can be of an arbitrary cross section and can include electrical conduits, light guides, fluid conduits, and the like, which are surrounded by the fiber-reinforced outer resin structure and whose form is determined by forming nozzles or matrices.

In this known method, it is possible to employ an optical fiber (light guide) as a center fiber on which the surrounding reinforcing fibers are run, whereby the light guide is coated with a separating agent in which the resin does not adhere. In this manner the light guide is surrounded by more or less loosely applied resinous cage of reinforcing fibers which cab be withdrawn from the light guide without any breakage of adhesive connections between the resin and the light guide.

A high tensile fiber-compound material in which glass fibers oriented in one direction are bound with polyester resin is commercially available from Bayer AG of Leverkusen, Germany, under the registered trademark Polystal. This material, in connection with a light guide, has been hitherto employed as a protective material for optical communications cables only. In the latter cables, care is always taken that the light guide be loosely inserted in its outer jacket, so that outer stresses be minimized, and in addition that the different expansions between the light guide and the jacket be compensated. An example of such an application is disclosed in the German publication DE-OS No. 3,112,422.

Furthermore, it is also known how to employ a light guide for monitoring component parts exposed to a tensile stress. For example, in German publication DE-OS No. 2,937,824 a method is described in which the light guide is cemented on or inserted into a component part to be monitored, the cementing being used preferably for metal parts and the insertion is used for component parts of a plastic material or of concrete. In this priorart method the inlet and outlet ends of the light guide are connected to an instrument for testing the light throughput, so that the light conduction or attenuation is continuously or intermittently monitored to serve as a measure of expansion or the danger of breakage of the associated component.

SUMMARY OF THE INVENTION

A general object of the present invention is to provide a high tensile wire structure including fiber-reinforced resinous outer jacket enclosing a light wave conductor in the form of an optical fiber, the wire structure being improved to permit an optical monitoring of tensile stresses, breakage, as well as bending stresses applied to the wire structure.

In keeping with this object and others which will become apparent hereafter, one feature of the invention resides in the provision of an intermediate layer or sleeve surrounding the light guide, the intermediate sleeve being of a synthetic material having an inhomogeneous or heterogeneous structure and being mechanically firmly connected to the outer sleeve and to the light guide of the wire structure; those ends of the light guide are provided with optical couplings for connection to a light throughput testing instrument.

In the preferred embodiment of this invention, the intermediate layer is made of a synthetic or plastic material or of a synthetic resin to which a certain amount of finely divided powder of glass, quartz, corundum or emery, is admixed. The intermediate layer may also consist of resin-impregnated glass fibers which are coiled on the light guide. In a modification, the intermediate layer can be firmly connected as a first layer to the inner surface of the fiber-reinforced resinous outer sleeve.

The essential features of this invention are the heterogeneous construction of the intermediate layer between the outer sleeve and a single optical fiber forming the light guide, and the firm mechanical connection between these three component parts. This intermediate layer can also be designated as a secondary layer, inasmuch as each optical fiber immediately after its manufacture is protected with a thin primary layer of a synthetic resin. Since during the elongation of a strained wire the intermediate layer is reduced in cross section to a greater extent than the light guide, transverse forces are produced which are transferred from the inhomogeneous intermediate layer onto the light guide and subject the latter to microscopic bendings. These microbends in turn cause an increase of attenuation effect which is used as a measure for the dilatation.

Such effects, and hence the indication sensitivity, can be still further amplified by arranging one or more light guides coated in accordance with this invention off the center axis of the wire structure. This arrangement is suitable particularly for monitoring bending loads. In a preferred modification, two mutually linked light guides each provided with the intermediate layer are embedded in the outer sleeve outside the center axis of the latter.

The advantage of this invention resides in the possibility of testing in a very simple manner the high tensile wire structures of the aforedescribed kind which are installed in building structures or component parts. The testing and monitoring of the wire structures of this invention can be made not only with regard to the tensile strength, breakage or bending strain but also with regard to other magnitudes registered by the light guide, such as exposure to radiation, and the like. The invention is not limited to wires or round profiles only, but can be readily extended to other types of elongated profiles, or to tubes and hollow profiles in which the coated light guide is embedded in the wall.

The novel features which are considered characteristic for the invention are set forth in particular in the appended claims. The invention itself, however, both as to its constuction and its method of operation, together with additional objects and advantages thereof, will be best understood from the following description of specific embodiments when read in connection with the accompanying drawing.

BRIEF DESCRIPTION OF THE DRAWING

FIG. 1 is a perspective view of a high tensile wire structure of this invention having a coaxial light guide;

FIG. 2 is a modification of the wire of FIG. 1, provided with a pair of parallel light guides; and FIG. 3 shows in a schematic perspective view an application of the wire of FIG. 1 as a span wire in a reinforced concrete bridge in connection with a light throughput testing instrument.

DESCRIPTION OF THE PREFERRED EMBODIMENTS

Referring to FIGS. 1 and 2, the high tensile wire 1 of a fiber compound substance or fiber-reinforced resinous structure 1 forming the outer jacket or sleeve of the wire structure encloses a light guide in the form of an optical fiber 2 which in turn is enclosed in an intermediate sleeve 3 of a synthetic hetergeneous material. In the embodiment of FIG. 1, there is employed only a single light guide with the associated intermediate sleeve 3, arranged coaxially with the outer sleeve 1. The projecting ends of the light guide 2 are provided with coupling connectors (5 in FIG. 3) of which one is connected to a light transmitter and the other to a light receiver. In the modification of FIG. 2, two parallel light guides 2 are arranged off the central axis of the wire 1 and each is provided with an intermediate sleeve 3. One of the light guides serves for feeding in a light beam, and the other light guide serves for returning the light beam. In this case, the non-illustrated other ends of the light guides are interconnected. The arrangement of FIG. 2 is suitable particularly for monitoring those construction parts in which only a single wire of fiber-reinforced resinous structure is embedded and at which the light passage is measured at one side of the wire only.

FIG. 3 shows an example of an application of the wire of this invention. The tensile wire 1 is embedded in a meander-like fashion in a concrete bridge 4 to serve as a reinforced concrete span wire. The light coupling means 5 at the ends of the central light guide are connected via conduit 6 to a light measuring instrument 7 including a light transmitter S and a light receiver E to continuously monitor the entire surface of the bridge.

In another exemplary application, the monitoring of spaces exposed to radiation is made possible by the embodiment of FIG. 2. In this case one of the two light guides 2 is made of a glass fiber doped with substances sensitive to the radiation to be monitored, and in contrast to the other light guide the radiation-sensitive light guide is loosely inserted in the intermediate sleeve 3, so that mechanical loads applied on the fiber-compound wire do not produce any attenuation variations on the passing light (with the exception of the interruption of the wire). The other light guide is firmly mechanically connected to the intermediate layer 3 which in turn is firmly connected to the outer sleeve of the fiber-reinforced resin so that during elongation of wire 1 transverse forces are transferred on the other light guide in the manner as described before. This arrangement makes it possible to compare the attenuation variations in the two parallel light guides and to obtain information whether the wire is subject to mechanical stresses or to radiation or both.

It will be understood that each of the elements described above, or two or more together, may also find a useful application in other types of constructions differing from the types described above.

While the invention has been illustrated and described as embodied in a high tensile wire of circular profile, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A high-tensile wire structure comprising an outer sleeve of a fiber-reinforced resinous material; said outer sleeve enclosing a single optical fiber forming a light wave conductor; an intermediate sleeve of a heterogenous material provided between and being firmly connected with said outer sleeve and said single optical fiber; said heterogenous material including plastic or synthetic resin into which finely divided powder of glass or quartz or corundum or emery is admixed; and means for coupling the ends of said optical fiber to a light testing instrument to sense attenuation of light due to microscopic bends in said optical fiber caused by transverse pressure exerted by said heterogenous material during constriction of said wire structure.

2. A wire structure as defined in claim 1, wherein said intermediate layer is the innermost layer of a laminated fiber-reinforced outer sleeve.

3. A wire structure as defined in claim 1, wherein said outer sleeve defines a center axis and said single optical fibers together with said intermediate sleeve are arranged off said center axis.

4. A wire structure as defined in claim 1, comprising a pair of parallel optical fibers each being provided with an intermediate sleeve of a synthetic heterogeneous material.

5. A high-tensile wire structure comprising an outer sleeve of a fiber-reinforced resinous material said outer sleeve enclosing a single optical fiber forming a light wave conductor; an intermediate sleeve of a heterogeneous material provided between and being firmly connected with said outer sleeve and said single optical fiber; said heterogeneous material including plastic or synthetic resin in which glass fibers coiled on said optical fiber are embedded; and means for coupling the ends of said optical fiber to a light testing instrument to sense attenuation of light due to microscopic bends in said optical fiber caused by transverse pressure exerted by said heterogeneous material during constriction of said wire structure.

* * * * *